United States Patent
Dziemballa et al.

(10) Patent No.: US 7,896,359 B2
(45) Date of Patent: Mar. 1, 2011

(54) METHOD OF PRODUCING DIVIDED TUBE STABILIZERS HAVING A SWIVEL MOTOR

(75) Inventors: Hans Dziemballa, Iserlohn (DE); Lutz Manke, Hagen (DE); Frank Schneider, Dortmund (DE)

(73) Assignee: ThyssenKrupp Technologies AG, Essen (DE)

( * ) Notice: Subject to any disclaimer, the term of this patent is extended or adjusted under 35 U.S.C. 154(b) by 500 days.

(21) Appl. No.: 11/791,638

(22) PCT Filed: Nov. 4, 2005

(86) PCT No.: PCT/EP2005/011813
§ 371 (c)(1),
(2), (4) Date: Apr. 16, 2008

(87) PCT Pub. No.: WO2006/056307
PCT Pub. Date: Jun. 1, 2006

(65) Prior Publication Data
US 2009/0085310 A1    Apr. 2, 2009

(30) Foreign Application Priority Data
Nov. 27, 2004    (DE) .......................... 10 2004 057 429

(51) Int. Cl.
*B60G 17/015*    (2006.01)
(52) U.S. Cl. ................ 280/5.511; 280/124.152; 267/188
(58) Field of Classification Search ............... 280/5.506, 280/5.511, 124.106, 124.152, 124.166; 267/188
See application file for complete search history.

(56) References Cited

U.S. PATENT DOCUMENTS

| | | | | |
|---|---|---|---|---|
| 4,796,911 A | * | 1/1989 | Kuroki et al. | 280/5.511 |
| 4,836,516 A | * | 6/1989 | Wycech | 267/279 |

(Continued)

FOREIGN PATENT DOCUMENTS

DE    198 53 798 C1    9/2000

(Continued)

OTHER PUBLICATIONS

International Search Report dated Feb. 9, 2006 including English translation of relevant portion (Eleven (11) pages).

(Continued)

*Primary Examiner* — Toan C To
(74) *Attorney, Agent, or Firm* — Crowell & Moring LLP

(57) ABSTRACT

The invention relates to a method of producing a divided tube stabilizer having a swivel motor (2) mutually coupling two tube stabilizer halves (3, 4), a first tube stabilizer half (3) being non-rotatably connected with a first connection part (5) of the swivel motor, and a second stabilizer half (4) being non-rotatably connected with a second connection part (6) of the swivel motor (2). In order to achieve that the tube stabilizer halves can be easily linked in a non-rotatable manner with the connection parts of the swivel motor, the following process steps are suggested:
  a. The tube ends to be connected with the connection parts (5, 6) of the swivel motor (2) are expanded and upset in one working step by means of a mandrel (20);
  b. the tube stabilizer halves (3, 4) with the expanded and upset ends are shaped to their final shape by bending;
  c. the finished bent tube stabilizer halves (3, 4) are subjected to a heat treatment;
  d. the expanded and upset tube ends of the heat-treated tube stabilizer halves (3, 4) are material-lockingly connected with the respective connection parts (5, 6) of the swivel motor (2).

19 Claims, 2 Drawing Sheets

U.S. PATENT DOCUMENTS

| | | | | |
|---|---|---|---|---|
| 5,527,061 | A | * | 6/1996 | Karl ........................ 280/124.107 |
| 5,580,079 | A | * | 12/1996 | Pradel et al. ............ 280/124.107 |
| 6,435,531 | B1 | * | 8/2002 | Acker et al. ............ 280/124.107 |
| 6,550,788 | B2 | * | 4/2003 | Schmidt et al. ............ 280/5.511 |
| 6,698,767 | B2 | * | 3/2004 | Hagan ........................ 280/5.511 |
| 7,204,494 | B2 | | 4/2007 | Reichel et al. |
| 7,588,259 | B2 | * | 9/2009 | Azekatsu et al. ...... 280/124.107 |
| 2006/0049601 | A1 | * | 3/2006 | Matsumoto ............ 280/124.106 |
| 2008/0150241 | A1 | * | 6/2008 | Azekatsu et al. .......... 280/5.511 |
| 2009/0091094 | A1 | * | 4/2009 | Sano ........................ 280/5.511 |
| 2009/0166900 | A1 | * | 7/2009 | Chen ............................. 261/79.2 |

FOREIGN PATENT DOCUMENTS

| | | |
|---|---|---|
| DE | 199 30 444 A1 | 1/2001 |
| DE | 199 36 541 A1 | 2/2001 |
| DE | 102 25 035 A1 | 1/2004 |
| DE | 10 2004 057 429 A1 | 6/2006 |
| JP | 2-61338 B2 | 11/1983 |
| JP | 63-32547 Y2 | 6/1985 |
| JP | 11-333586 A | 12/1999 |
| JP | 2000-24737 A | 1/2000 |
| WO | WO 2004/037573 A1 | 5/2004 |

OTHER PUBLICATIONS

Form PCT/IB/338, Form PCT/IB/326, Form PCT/IB/373 and Form PCT/ISA/237 w/English Translation of Pertinent Portions (Eleven (11) pages).

Japanese Office Action dated Jun. 2, 2010 (Seven (7) pages).

* cited by examiner

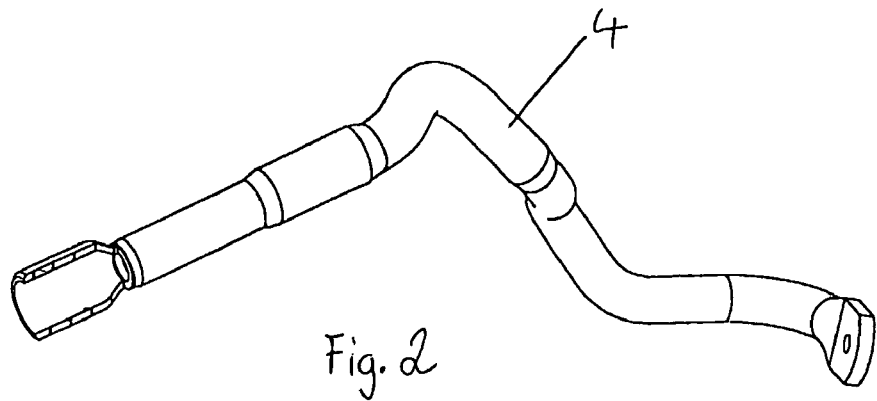
Fig. 2
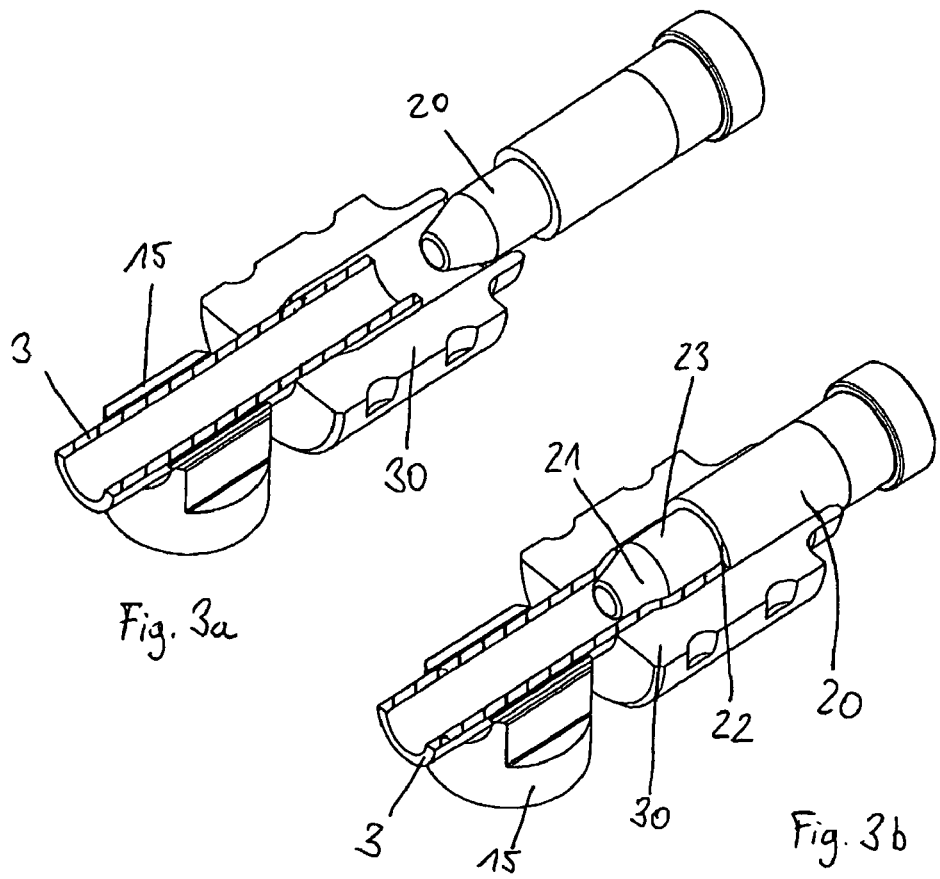
Fig. 3a
Fig. 3b

METHOD OF PRODUCING DIVIDED TUBE STABILIZERS HAVING A SWIVEL MOTOR

The invention relates to a method of producing a divided tube stabilizer having a swivel motor coupling two tube stabilizer halves, according to the preamble of Claim 1.

STATE OF THE ART

Divided tube stabilizers of this type are used in motor vehicles for counteracting rolling motions of the vehicle body. The swivel motor, which mutually couples the tube stabilizer halves, has the purpose of twisting the tube stabilizer halves against one another and thus transmitting different forces upon the two wheels of an axle, so that a rolling motion of the vehicle body is counteracted.

Several methods of producing such divided tube stabilizers are known from the state of the art. Thus, from German Patent Documents DE 199 30 444 C2 and DE 199 36 541 C2, methods are known in which the non-rotatable connection between the tube stabilizer halves and the swivel motor (actuator) is implemented by way of separate coupling members. Thus, in the case of the methods known from this patent document, additional components, specifically coupling members, are required.

From German Patent Document DE 198 53 798 C1, it is known to mutually connect stabilizer halves consisting of solid bars in a torsion-proof manner by means of an additional sleeve. For this purpose, the stabilizer halves to be mutually connected have external teeth by way of which the connection sleeve is pushed on. Subsequently, the connection sleeve is plastically deformed, so that a form-locking connection is established between the sleeve and the respective stabilizer halves. For this type of connection, an additional component, specifically the sleeve, is also required.

Finally, it is known from German Patent Document DE 102 25 035 A1 to mutually connect in a non-rotatable manner two stabilizer halves consisting of solid bars by way of an outer rotating part. In this case, it is provided that the outer rotating part is non-rotatably connected with a stabilizer half by way of a weld seam. The weld seam has the function of closing off the interior working spaces of the actuator toward the outside in a pressure-tight manner and of axially securing the stabilizer half connected with the outer rotating part with respect to the outer rotating part. The method known from this patent document requires comparatively high expenditures with respect to manufacturing and cannot easily be applied to tube stabilizers.

DEFINITION OF OBJECTS

It is an object of the invention to provide a method of producing a divided tube stabilizer having a swivel motor mutually coupling two tube stabilizer halves, by which weight-optimized tube stabilizer halves can be linked in a simple manner securely to the connection parts of the swivel motor in a non-rotatable manner. In particular, the non-rotatable connection should meet the requirements which exist on the basis of the alternating stress occurring during the usage because of changing torsion directions and other dynamic alternating stress. In addition, it is an object of the invention to provide a divided tube stabilizer having a swivel motor which has a simple construction and in the case of which a weight-optimized non-rotatable connection between the tube stabilizer halves can be implemented which reliably takes into account the stress occurring during the usage.

The advantage of the method according to the invention is the fact that a direct linkage of the tube stabilizer halves to the connection parts of the swivel motor becomes possible. The material-locking connection, which can be established particularly by welding (MAG welding, laser beam welding), is particularly suitable for the changing stressing of this torsion-proof connection when the stabilizer is used.

A further advantage consists of the fact that the method according to the invention does not require additional components by means of which the torsion-proof connection only becomes possible.

A favorable fiber orientation in the material exists in the expanded and upset tube ends which are to be connected with the connection parts of the swivel motor, because no machining of the tube ends takes place in the case of the production method according to the invention.

As a result of the elimination of additional auxiliary joining parts, which are connected with the stabilizer halves by form-locking connections (as known from the state of the art), in the case of the invention, it is also not necessary to provide the stabilizer halves with teeth which permit a form-locking connection with the auxiliary joining part.

The widening and upsetting of the tube ends has several positive effects in the case of the invention. By means of the radial expansion, an enlargement of the diameter takes place, so that the geometrical moment of inertia of the tube end is increased. Simultaneously, the expansion results in a reduction of tensions in the later weld seam or generally in the later joining area, because a larger surface is obtained as a result of the expansion, on which surface the forces occurring during the usage are distributed. The tensions occurring during the usage are therefore clearly lower than in the case of unexpanded tube ends. In this manner, higher long-time rupture strength of the connection can be achieved.

The axial upsetting the tube end, which according to the invention takes place in one working step with the expansion, has the purpose of enlarging the wall thickness of the tube end. As a result, a stronger and better connection of the tube end with the connection parts of the swivel motor can be achieved.

The successful use of the invention is basically independent of whether the stabilizers have a constant or a non-uniform diameter course and/or wall thickness course along their longitudinal dimension. In practice, the tube sections forming the later tube stabilizer halves are frequently subjected in their straight condition to one or more local deformations, by which the wall thickness and/or the diameter of the straight tube section are adapted to the demands of the later stabilizer. Thus, in practice, the desired course of the wall thickness and/or diameter along the longitudinal dimension of the stabilizer is frequently generated, for example, by a local swaging of the straight tube sections.

The connection parts of the swivel motor, with which the ends of the tube stabilizer halves are connected in a material-locking manner, are preferably constructed as shafts. Solid shafts (thus, shafts made of a solid material) as well as hollow shafts are basically equally suitable. If the connection parts are constructed as hollow shafts, care should be taken with respect to the dimensioning, particularly of the wall thickness of the hollow shaft, that the required torques can be securely transmitted.

In a preferred embodiment of the invention, a matrix tool is arranged around the tube end during the expanding by means of the mandrel, the inside diameter of the matrix tool corresponding exactly to the desired later outside diameter of the tube end after the expansion and upsetting. This matrix tool is used for the calibrating of the outside diameter of the tube and particularly of tube face, so that a plane ring surface is obtained as the tube face. Thus, preferably this calibrating step in the case of the invention again takes place during the same working step as the expanding and the upsetting.

In principle, it is conceivable that the expanding, the upsetting and the calibrating of the tube ends is carried out in the cold condition, in the semicold condition or in the hot condition. The deforming of the tube ends preferably takes place in the hot condition, for example, at approximately 900° C. If the necessity of heating the tube ends is to be eliminated, the expanding and upsetting as well as the calibrating of the tube ends may also take place in the cold condition. In this case, the tools and machines are to be designed to be stronger corresponding to the higher forces.

The tube stabilizer according to the invention does not require additional coupling elements because the ends constructed for the connection of the tube stabilizer halves are integrally shaped from the material of the tube stabilizer halves themselves. The tube stabilizer according to the invention therefore has a simple construction and can be easily handled during the assembly. As a result of the radial expanding of the end of the respective tube stabilizer half to be connected with the connection part of the swivel motor, a larger connection surface is achieved in which the tensions occurring during the usage are reduced. The enlargement of the wall thickness achieved by the simultaneously occurring axial upsetting also contributes to an enlargement of the surface available for absorbing the occurring forces. In addition, the wall thickness, which is increased in the area of the ends, leads to a material-locking connection, which has a significantly higher loading capacity and a higher long-time rupture strength than could be obtained without an axial upsetting.

For optimizing the total weight of the tube stabilizer, individual areas or sections of the tube stabilizer can be shaped by local deforming methods such that its wall thickness and/or its diameter is locally reduced corresponding to the loads occurring during the usage. For achieving this, for example, local swaging can be used as the deforming method. In a manner known per se, this method is carried out at the straight tube sections forming the later tube stabilizer halves.

EMBODIMENT

Other objects, advantages and novel features of the present invention will become apparent from the following detailed description of one or more preferred embodiments when considered in conjunction with the accompanying drawings.

BRIEF DESCRIPTION OF THE DRAWINGS

The invention will be explained in detail in the following by means of drawings illustrating an embodiment.

FIG. 2 is a view of a tube stabilizer half produced according to the method of the invention, the expanded and upset tube end being shown in a cross-sectional view;

FIGS. 3a and 3b are cross-sectional views of the working step of the expanding and upsetting with a simultaneous calibrating step.

DETAILED DESCRIPTION OF THE DRAWINGS

Figure 1:
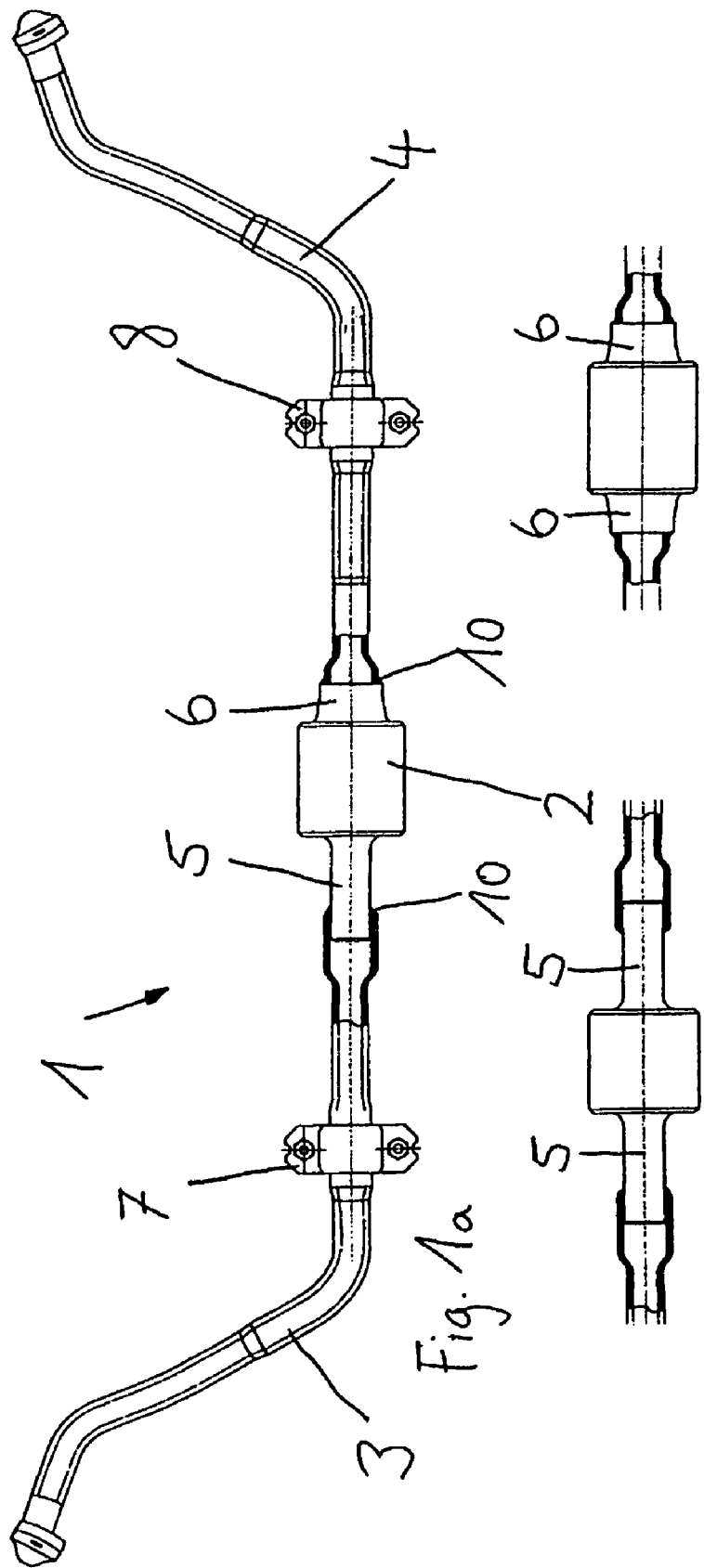
FIG. 1a is a view of a divided tube stabilizer which is produced according to the method of the invention and has a swivel motor.
FIG. 1b is a view of a tube stabilizer having a swivel motor, in the case of which the connection parts are constructed as solid shafts.
FIG. 1c is a view of a tube stabilizer having a swivel motor, in the case of which the connection parts are constructed as hollow shafts.

FIG. 1a illustrates a divided tube stabilizer 1 produced according to the method of the invention and having a swivel motor 2. The two tube stabilizer halves 3, 4 have expanded and upset tube ends at their ends facing the swivel motor 2, which tube ends are non-rotatably connected by way of weld seams 10 with the connection parts of the swivel motor 2, which are constructed as shafts 5, 6 here. In this case, the shaft 5 shown on the left in FIG. 1a is constructed as a solid shaft, while the right-hand shaft 6 is constructed as a hollow shaft. It is understood that the arrangement of the shafts 5, 6 may also be reversed.

Along their longitudinal dimension, the tube stabilizer halves 3, 4 have sections of different diameters and/or with a reduced wall thickness. These sections were, for example, generated by swaging at the straight, not yet bent tube sections. After the swaging of the straight tube sections, the tube ends to be connected with the shafts 5, 6 of the swivel motor 2 were expanded and upset. This process step will be explained more precisely in the following with reference to FIG. 3a and FIG. 3b.

The spatial shape of the tube stabilizer halves 3, 4 illustrated in FIG. 1a is generated by bending in a manner known per se. Likewise, the flattenings and perforations at the ends of the tube stabilizer halves 3, 4 facing away from the swivel motor 2 are produced in a manner known per se.

Furthermore, FIG. 1a shows bearings 7, 8 by means of which the divided tube stabilizer can be fastened to the vehicle body.

FIG. 1b shows an embodiment of the tube stabilizer according to the invention, where both connection parts 5 are constructed as solid shafts which are fitted into the expanded and upset ends of the respective tube stabilizer halves and are material-lockingly connected therewith. In contrast, FIG. 1c shows an embodiment in which the two connection parts 6 are constructed as hollow shafts into which the expanded and upset ends of the respective tube stabilizer halves are fitted. Also in this embodiment, the hollow shafts 6 are material-lockingly connected with the tube stabilizer halves.

For a better understanding, in FIG. 2, the tube stabilizer half 4 of FIG. 1a is illustrated without a swivel motor 2 and without a bearing 8. The expanded tube end, which is used for the non-rotatable connection of the tube stabilizer half 4 with the shaft 6, not shown in FIG. 2, of the swivel motor 2 (compare FIG. 1a) is shown as a sectional view in FIG. 2.

FIG. 3a and FIG. 3b are views of the process step of expanding and upsetting the ends of the tube stabilizer halves 3, 4. Here, FIG. 3a shows the situation before the penetration of the expanding mandrel 20 into the tube end. FIG. 3b shows the situation after the expanding and calibrating of the tube end.

In FIG. 3a, the tube stabilizer half 3 is held by means of the clamping jaw 15 in a holding device otherwise not shown in detail. The tube end is situated in the inner bore of a matrix tool 30. The mandrel 20 is arranged in the ready position in front of the tube end of the tube stabilizer half 3.

In order to achieve the expanding and upsetting with a simultaneous calibrating of the tube end, the mandrel 20 is now pushed axially into the tube end. As a result, because of its conical tip 21, the mandrel 20 expands the tube end. Set back in the axial direction from the conical tip 21, the mandrel 20 has a radial step 22, the material of the tube end being supported against this step 22, so that the tube end is upset between the stationary clamping jaw (15) and the radial step 22. In this case, the material of the tube end is thickened in the area of the cylindrical section 23 of the mandrel 20. In this manner, the wall thickness of the expanded tube end is increased.

The matrix tool (30) has a defined inside diameter, so that the circumferential surface of the tube end is calibrated with respect to the diameter. Simultaneously, because of the radial step 22, the face of the tube end is also calibrated, so that an axially plane face is obtained.

The expanding, upsetting and calibrating operation illustrated in FIG. 3a and FIG. 3b preferably takes place in the heated condition, for example, at approximately 900° C.

LIST OF REFERENCE NUMBERS

1 Divided tube stabilizer
2 swivel motor
3 tube stabilizer half
4 tube stabilizer half
5 connection part, shaft, solid shaft
6 connection part, shaft, hollow shaft
7 bearing
8 bearing
10 weld seam
15 clamping jaw
20 mandrel
21 conical tip
22 radial step
23 cylindrical section
30 matrix tool

The invention claimed is:

1. Method of producing a divided tube stabilizer having a swivel motor mutually coupling two tube stabilizer halves, a first tube stabilizer half being non-rotatably connected with a first connection part of the swivel motor, and a second stabilizer half being non-rotatably connected with a second connection part of the swivel motor,
characterized in that
   a. the tube ends to be connected with the connection parts of the swivel motor are expanded and upset in one working step by means of a mandrel,
   b. the tube stabilizer halves with the expanded and upset ends are shaped to their final shape by bending,
   c. the finished bent tube stabilizer halves are subjected to a heat treatment,
   d. the expanded and upset tube ends of the heat-treated tube stabilizer halves are material-lockingly connected with the respective connection parts of the swivel motor.

2. The method according to claim 1, characterized in that, before the expanding and upsetting, local sections with a reduced diameter and/or a reduced wall thickness are placed in the straight tube sections which form the later tube stabilizer halves.

3. The method according to claim 1, characterized in that the connection parts of the swivel motor are constructed as shafts (solid or hollow shafts).

4. The method according to claim 1, characterized in that tube ends are expanded and upset in the heated condition.

5. The method according to claim 1, characterized in that the tube ends to be expanded and upset, during the introduction of the mandrel, are surrounded by a matrix tool for the calibrating of the tube ends taking place in one working step with the expanding and the upsetting.

6. The method according to claim 1, characterized in that the expanding and upsetting of the tube ends takes place in several steps.

7. The method according to claim 1, characterized in that the ends of the tube stabilizer halves not to be connected with the swivel motor are flattened and perforated before the tube stabilizer halves are material-lockingly connected with the connection parts.

8. The method according to claim 1, characterized in that the material-locking connection of the tube stabilizer halves with the connection parts of the swivel motor takes place by welding.

9. The method according to claim 8, characterized in that MAG welding or laser beam welding is used as the welding method.

10. The method according to claim 1, characterized in that the tube stabilizer halves are painted before the material-locking connection with the connection parts of the swivel motor.

11. Divided tube stabilizer having a swivel motor mutually coupling two tube stabilizer halves, a first tube stabilizer half being material-lockingly connected with a first connection part of the swivel motor and a second tube stabilizer half being material-lockingly connected with a second connection part of the swivel motor, wherein
   the ends of the tube stabilizer halves that are material-lockingly connected with the connection parts are constructed as expanded and upset ends, which are shaped from the material of the tube stabilizer halves themselves as their integral component, by an expanding and upsetting of the tube ends taking place in one working step.

12. The tube stabilizer according to claim 11, wherein, along its longitudinal dimension, it has local sections of a different wall thickness and/or of a different diameter, which are produced by local deformations.

13. The tube stabilizer according to claim 11, wherein the connection parts of the swivel motor are constructed as shafts that are one of solid and hollow.

14. The tube stabilizer according to claim 13, wherein the inside diameter of the expanded and upset ends of the tube stabilizer halves is greater than the outside diameter of the respective shaft material-lockingly connected with the end, the material-locking connection being constructed as a weld seam.

15. The tube stabilizer according to claim 13, wherein the outside diameter of the expanded and upset ends of the tube stabilizer halves is smaller than the inside diameter of the respective hollow shaft material-lockingly connected with the end, the material-locking connection being constructed as a weld seam.

16. The tube stabilizer according to claim 14, wherein the weld seam is constructed as a throat seam.

17. The tube stabilizer according to claim 14, wherein the weld seam is constructed as a laser weld seam or as a MAG weld seam.

18. A stabilizer device comprising:
   a swivel motor having first and second mutually rotatable connection parts extending therefrom;
   a first tube stabilizer half that is non-rotatably material-lockingly connected with said first connection part; and
   a second tube stabilizer half that is nonrotatably material-lockingly connected to the second connection part, wherein,
   ends of the tube stabilizer halves by which they are connected to the first and second connection parts are formed integrally as an expanded end region of tubes that form the tube stabilizer halves.

19. A stabilizer device according to claim 18, wherein:

said expanded end region of each of said tube stabilizer halves has a diameter that is expanded radially outward relative to said tube stabilizer outside said end regions; and walls of said end region of each of said tube-stabilizer halves are thickened relative to walls outside of said end region.

* * * * *